March 16, 1971　　　D. H. DAVIES　　　3,570,279
APPARATUS FOR AUTOMATICALLY RECORDING THE THICKNESS
OF A PRODUCT AND THE LOCATION OF DEFECTS THEREIN
Filed June 20, 1969　　　11 Sheets-Sheet 1

INVENTOR
DAVID H. DAVIES

BY
*Stevens, Davis, Miller & Mosher*
ATTORNEYS

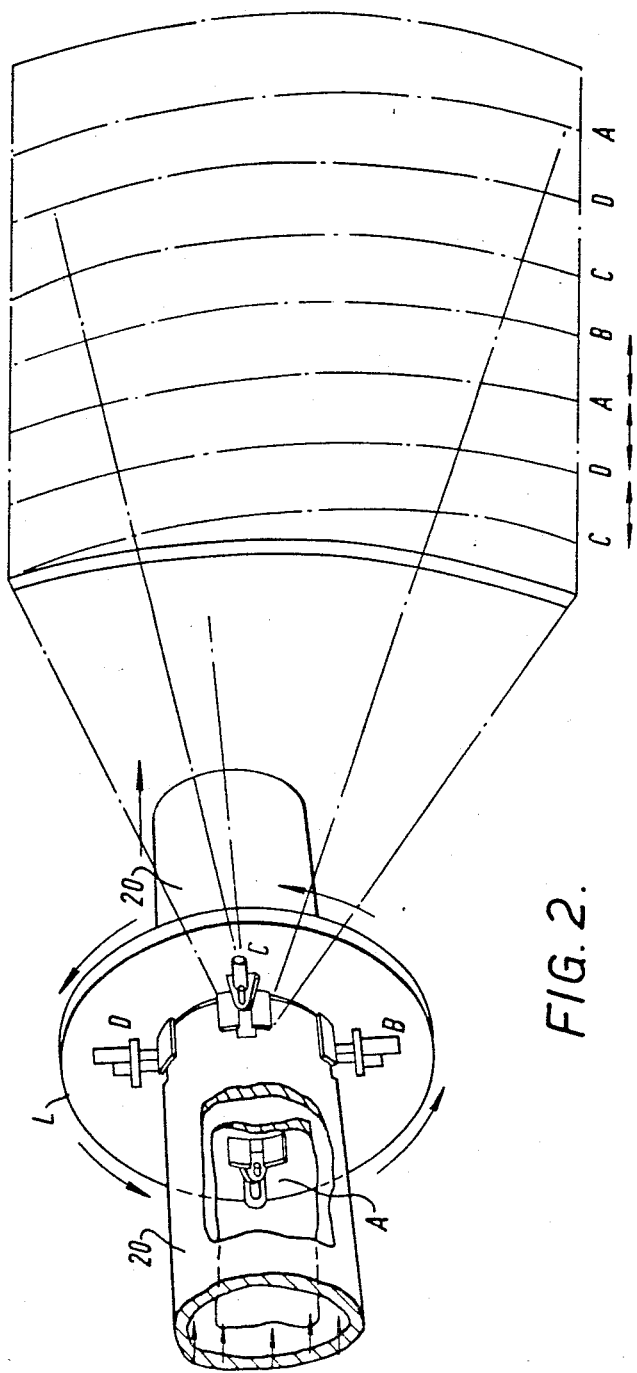

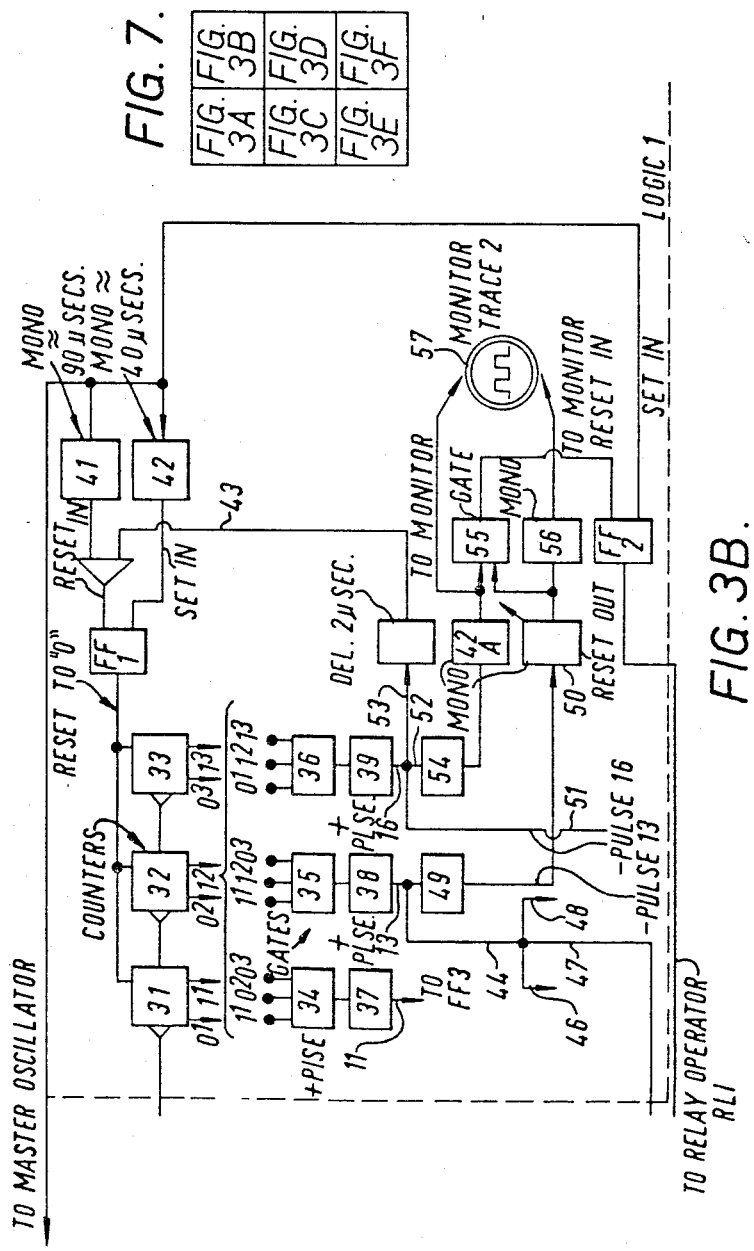

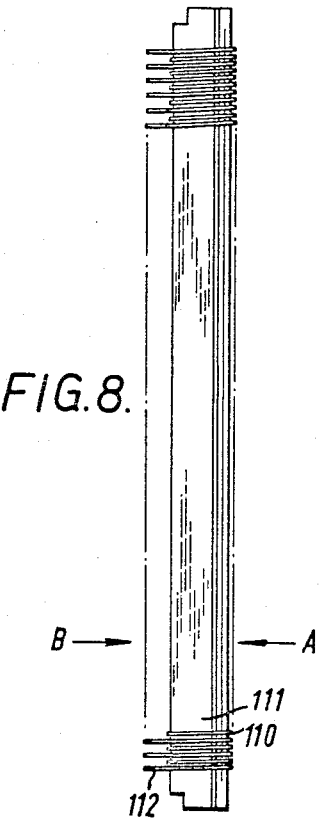
FIG.8.  FIG.10.
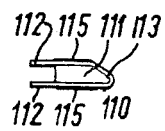
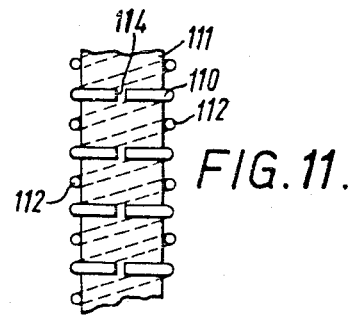
FIG.9  FIG.11.
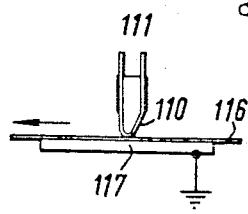
FIG.12.

United States Patent Office 3,570,279
Patented Mar. 16, 1971

3,570,279
APPARATUS FOR AUTOMATICALLY RECORDING THE THICKNESS OF A PRODUCT AND THE LOCATION OF DEFECTS THEREIN
David H. Davies, Corby, England, assignor to Stewarts and Lloyds Limited, Glasgow, Scotland
Continuation-in-part of application Ser. No. 535,766, Mar. 21, 1966. This application June 20, 1969, Ser. No. 835,053
Claims priority, application Great Britain, Jan. 2, 1963, 253/63; Mar. 25, 1965, 12,704/65
Int. Cl. G01n 29/04
U.S. Cl. 73—67.9
9 Claims

ABSTRACT OF THE DISCLOSURE

For automatically recording the thickness of a product and the location of a defect in the product, an apparatus and method are provided by which the surface of the product is scanned by ultrasonic pulses, the time interval between selected reflected pulses is measured and used to operate recording means to provide, on a recording medium moved in synchronism with the scanning, a record of the thickness and the defect, and a record of the position of the defect relative to the other two dimensions of the product.

---

The present application is a continuation-in-part of my earlier application Ser. No. 535,766 filed Mar. 21, 1966, and now abandoned, said application in turn being a continuation-in-part of my earlier application Ser. No. 334,308 filed Dec. 30, 1963, and also now abandoned.

This invention relates to a method of an apparatus for automatically recording the thickness of a product and the location of a defect (e.g. a lamination) in the product, for example, a cylindrical tube, a sheet or a strip, having smooth and parallel surfaces and of a homogeneous solid material. The invention particularly relates to a method of and apparatus for the purpose aforesaid for automatically recording the position of a defect with reference to the three dimensions of a product, namely, in the case of a cylindrical tube, the length, the thickness, and the circumferential length.

The present invention provides a method of automatically recording the thickness of a product and the location of a defect in the product wherein the surface of the product is scanned by ultrasonic pulses, reflected pulses are detected, and selected, the time interval between selected pulses is measured and the measured time interval is used to operate recording means to provide on a recording medium a first permanent record of the thickness of the product and the depth of a defect in the product in relation to one other dimension of the product and a second permanent record of the position of the defect in relation to said other dimension and the third dimension of the product, the movement of the recording medium through the recorder being synchronised with the scanning movements.

The invention also provides apparatus for automatically recording the thickness of a product and the location of a defect in the product comprising scanning mechanism for scanning the surface of the product, which scanning mechanism includes means for generating ultrasonic pulses and means for detecting and selecting ultrasonic pulses reflected fom said product, means for measuring the time interval between selected pulses and recording means controlled by signals from said detecting means for providing on a recording medium a first permanent record of the thickness of the product and the depth of a defect in the product in relation to one other dimension of the product and a second permanent record of the position of said defect in relation to said other dimension and the third dimension of the product, movement of the medium through the recording means being synchronised with the scanning movement.

Preferably, the apparatus includes means for actuating said ultrasonic generating means at pre-determined times, means for measuring the time intervals between selected reflected pulses, means controlled by said measuring means for marking a chart at positions dependent on the times of actuation of said generating means and on said time intervals, thereby making said first record, means responsive to reflected pulses detected within a predetermined time limit, and means conditioned by said responsive means for marking a chart when the responsive means responds to a reflected pulse and at positions dependent on said times of actuation of the generating means, thereby making said second record.

In the ultrasonic testing of materials by reflected pulses difficulty frequently arises as a result of interference between the various pulses so that accurate measurement becomes impossible, and the difficulty is particularly acute where a large number of tests are made in rapid succession. With the object of obviating or mitigating this difficulty, in a preferred form of the present invention each ultrasonic pulse is directed into the product in a direction normal to the surface thereof so as to generate a series of reflected pulses, and the time interval between a predetermined number of reflected pulses subsequent to at least the first two reflected pulses of a series is measured automatically and used to indicate in said first record the thickness of the product or the depth of a defect in the product.

Preferably, the time interval between the third reflected pulse and a subsequent pulse is measured.

Preferably, electrical means includes a plurality of markers arranged in two sets for providing said first and second records respectively, the markers of each set being arranged side by side in a row and being adapted to produce an aforesaid record on a chart moved transversely of said row.

It is clear that in order to provide an accurate and comprehensive record for a product which is scanned rapidly, as is normally desirable or essential in practice (e.g. where the product is a steel tube moving on a production flow line), the chart-marking arrangement must have a very high frequency response, i.e. the markers must be able to produce on the chart appropriate markings corresponding to electrical signals of very brief duration and occurring at very frequent intervals.

In order to obtain the desired high-frequency response, each of said sets of markers may comprise a plurality of electrically-separate conductors adapted to contact an electro-chemical recording chart and pass electric currents through the chart to produce visible markings thereon in accordance with said signals from the detecting means.

An embodiment of the invention will now be described, by way of example, with reference to the accompanying drawings, in which:

FIG. 2 shows, in perspective, a rotary unit comprising four ultrasonic transducers equally spaced around the circumference of a tube, producing a helical scanning pattern;

FIGS. 3A to 3F are block diagrams;

FIG. 7 is a diagram showing the way in which FIGS. 3A to 3F are to be arranged;

FIG. 8 is a side view of a set of markers;

FIG. 9 is an end view of said set;

FIG. 10 is a view in the direction of arrow A in FIG. 8;

FIG. 11 is an enlarged view of part of the device in the direction of arrow B in FIG. 8; and FIG. 12 is a schematic end view of the device in use with a grounded contact plate.

In the embodiment described, the product is a substantially cylindrical steel tube and is scanned in a close-pitched helix by four ultrasonic transducers electrically connected to the rest of the apparatus through sliprings. Defects in the thickness of the product are displayed automatically on a chart X (FIG. 6) whose width is proportional to a known thickness of steel (or any other standard), and whose length is proportional to the length of the helix which is proportional to the length of the tube. The position of the defect in the thickness of the tube and length wise along the tube is obtained together with a permanent record of the tube thickness.

Simultaneously, on another chart Y whose width is proportional to the circumference of the tube and whose length is proportional to the length of the tube, the location and shape of the defect relative to the length is indicated. Thus permanent records of the location and extent of the defect can be obtained for all dimensions.

Figure 1:
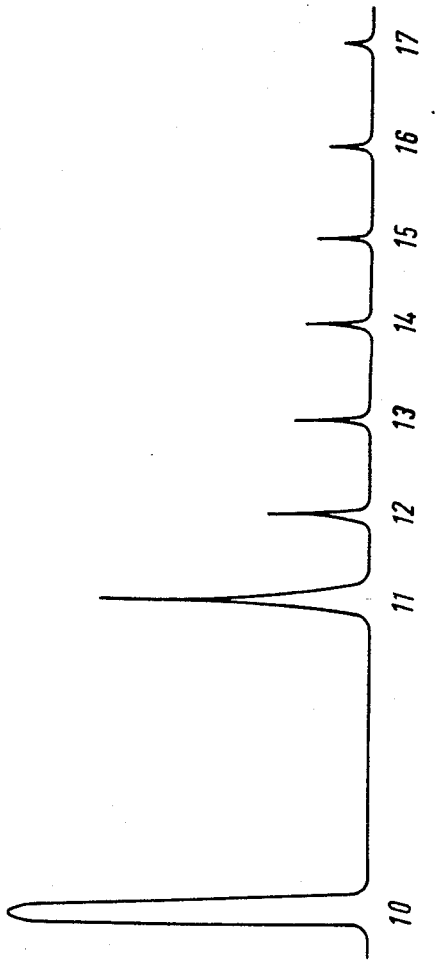
FIG. 1 is a representation, as seen on a cathode ray tube, of an ultrasonic pulse train including reflections from within the wall of a cylindrical tube.

One hundred fixed individual chart-marking devices (FIG. 8) (hereinafter referred to as markers) are located at regular intervals across chart X, in order to cover adequately the area to be examined by the detecting and recording device associated with said chart X. The number of markers used may, of course, vary with the resolution and accuracy of the thickness measurement required. If one hundred markers are used, marker number 0 corresponds to the outside surface of the tube and marker number 100 corresponds to one inch of steel. The reflected pulses from within the wall of the tube, if displayed on a cathode ray tube would appear as shown in FIG. 1, where 10 represents the transmitter pulse 11, the reflected pulse at the interface between the water of the utlrasonic transducer and the steel, and 12 to 17 represent pulses formed by multiple reflection within the wall of the tube. Successive reflections give uniformly spaced pulses. In this embodiment the time interval between pulse 13 and pulse 16 in considered (i.e. the time interval between the third and the sixth reflection). This time interval is equal to three pulse intervals. Although greater accuracy would be obtained by using a period of measurement greater than three pulse intervals, it has been found that the choice of the sixth internal reflection, which is present for about 80% of the time, is the most satisfactory. The third reflected pulse is chosen because the second pulse is frequently masked by the reflected pulse 11 at the interface.

Means is provided which first isolates pulses 13 and 16 from the other pulses and by means of an electronic counter measures the time interval between them. The counting frequency is such that a count of one hundred would be equal to one inch of steel say, and an indication causing a count of less than this number is displayed at a proportional position on chart X as the count is passed to an electronic means so that the appropriate marker is energised. The tube is scanned in a closepitched helix by the ultrasonic transducers. Therefore the chart X will display not only the position of a defect within the thickness of the tube but also its position along the length of the tube. At the same time the absolute thickness of the tube will be continuously displayed.

The chart Y is arranged with similarly one hundred fixed individual markers located at regular intervals across it, the markers corresponding to points spaced at one hundred equidistant positions around the circumference of the tube. In this way the width of the recording chart Y is made proportional to the circumference of the tube. By an electronic means a wall thickness of the tube which is below predetermined tolerance energises the appropriate marker to mark the chart. As a result, the position of the defect is shown in its relation to the circumference of the tube and, since the tube is scanned in a close-pitched helix, successive indications from the appropriate markers map out the position, area and shape of the defect in the wall of the tube as it would be seen if the cylindrical tube were slit longitudinally and opened out flat. For this reason this chart Y and its associated recording apparatus is referred to as the "geographic" recorder.

In the case where the defect in the tube wall takes the form of a large conglomeration of included matter which presents no acoustic reflecting surface, the ultrasound being absorbed and/or dispersed in a entirely random fashion, electronic means is provided to ensure that the defect does not escape detection. The electronic means detect that an absolute measurement of thickness has not been made, and in this event the first two markers on chart X are energised providing an arbitrary indication of the position of the defect. In the case of the "geographic" recorder, i.e. chart Y, the appropriate markers corresponding to the location of the defect on the circumference of the tube are energised.

Thus the apparatus produces a picture of the extent of the defect as seen from the outside of the tube on chart Y, and locates the defect in the thickness of the wall on chart X. The absolute thickness of the wall is continuously displayed and hence any eccentricity of variation in thickness of the tube is also displayed. As the tube is portrayed on each of the charts X and Y in two dimensions the apparatus may be used equally well for the examination of a product such as a sheet, plate or strip.

Referring particularly to FIG. 2 an annular rotating head L has four ultrasonic transducers A, B, C and D spaced equidistant around it. A cylindrical tube 20 is fed longitudinally through said head which revolves about the longitudinal axis of the tube 20 thereby helically scanning the tube. The head rotates at high speed to scan the tube in a close-pitched helix. Electrical connections to the transducers is made by means of conventional sliprings.

FIG. 2 shows part of the scanning pattern made by the transducers A, B, C and D.

Figure 3A:
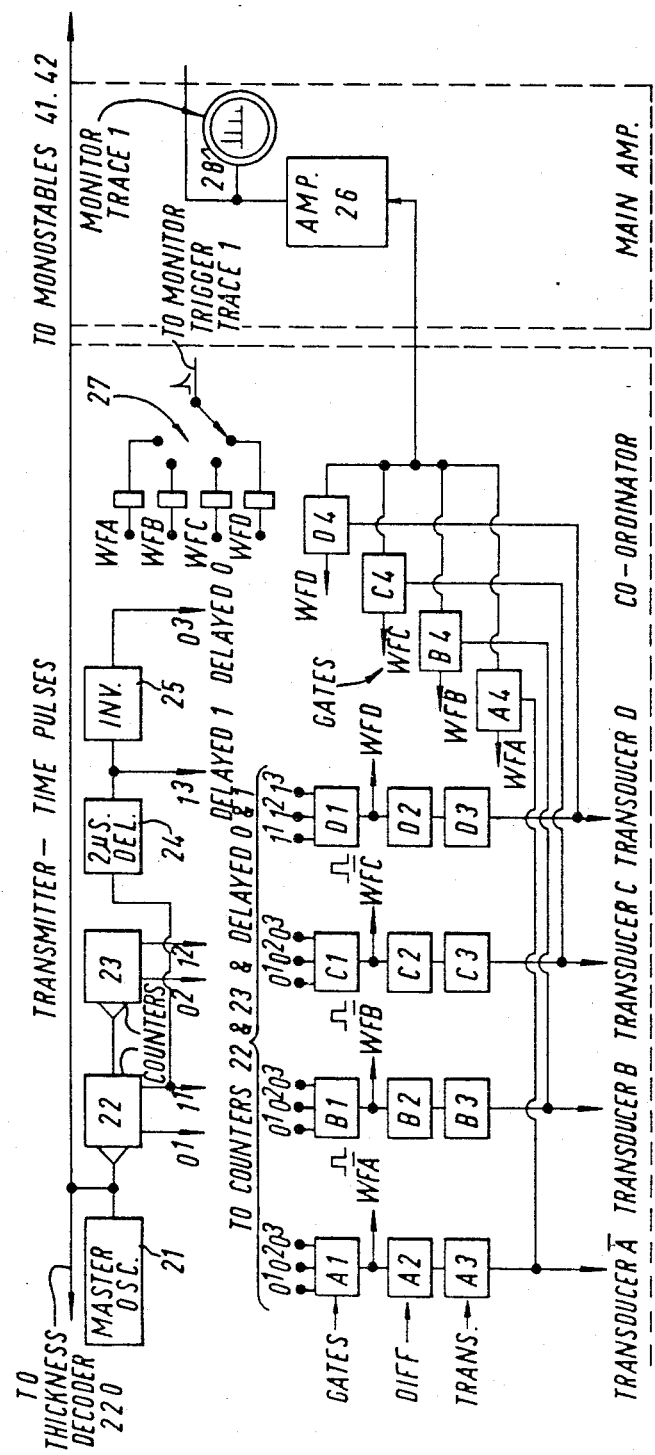
Figure 3C:
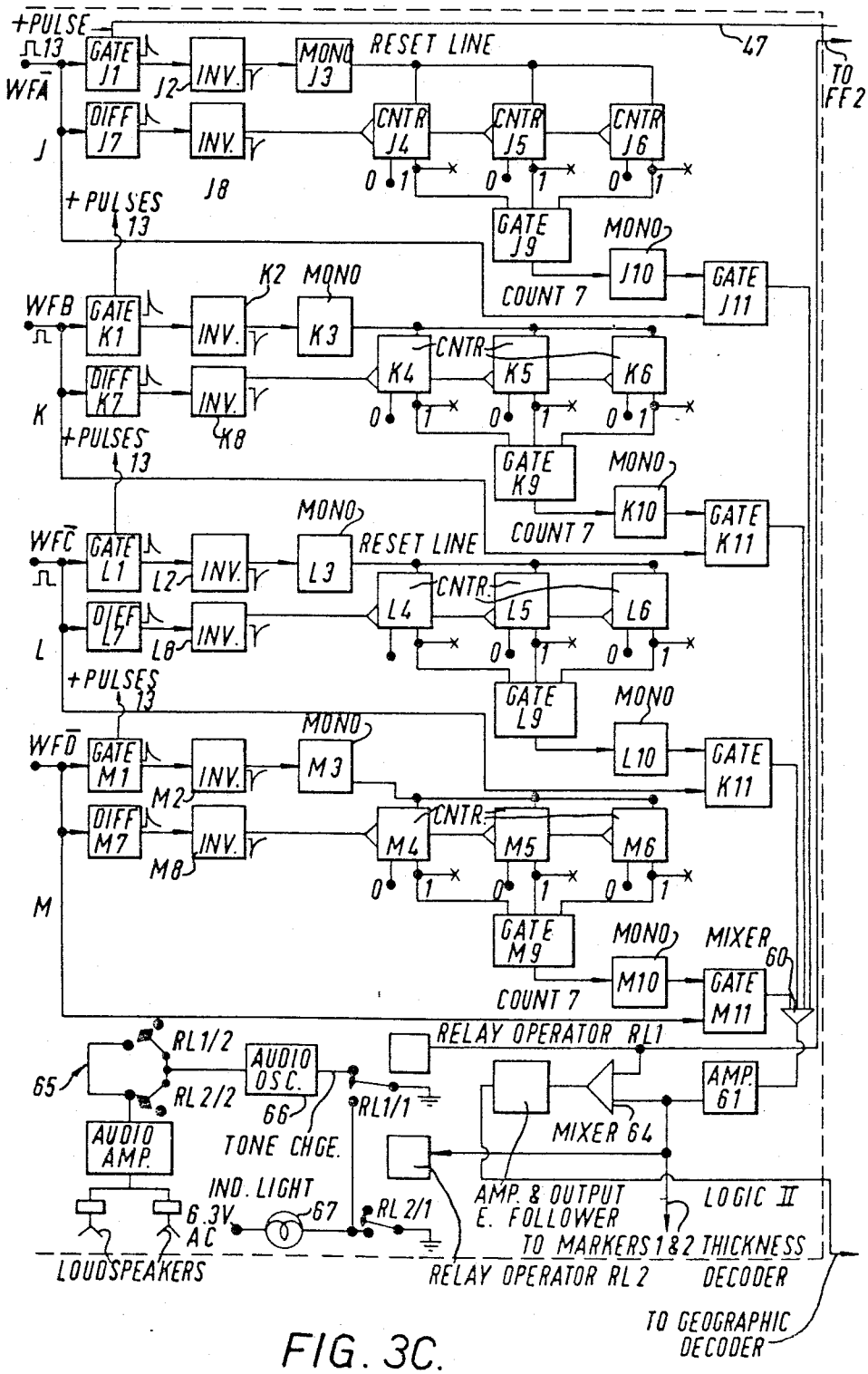
Figure 3D:
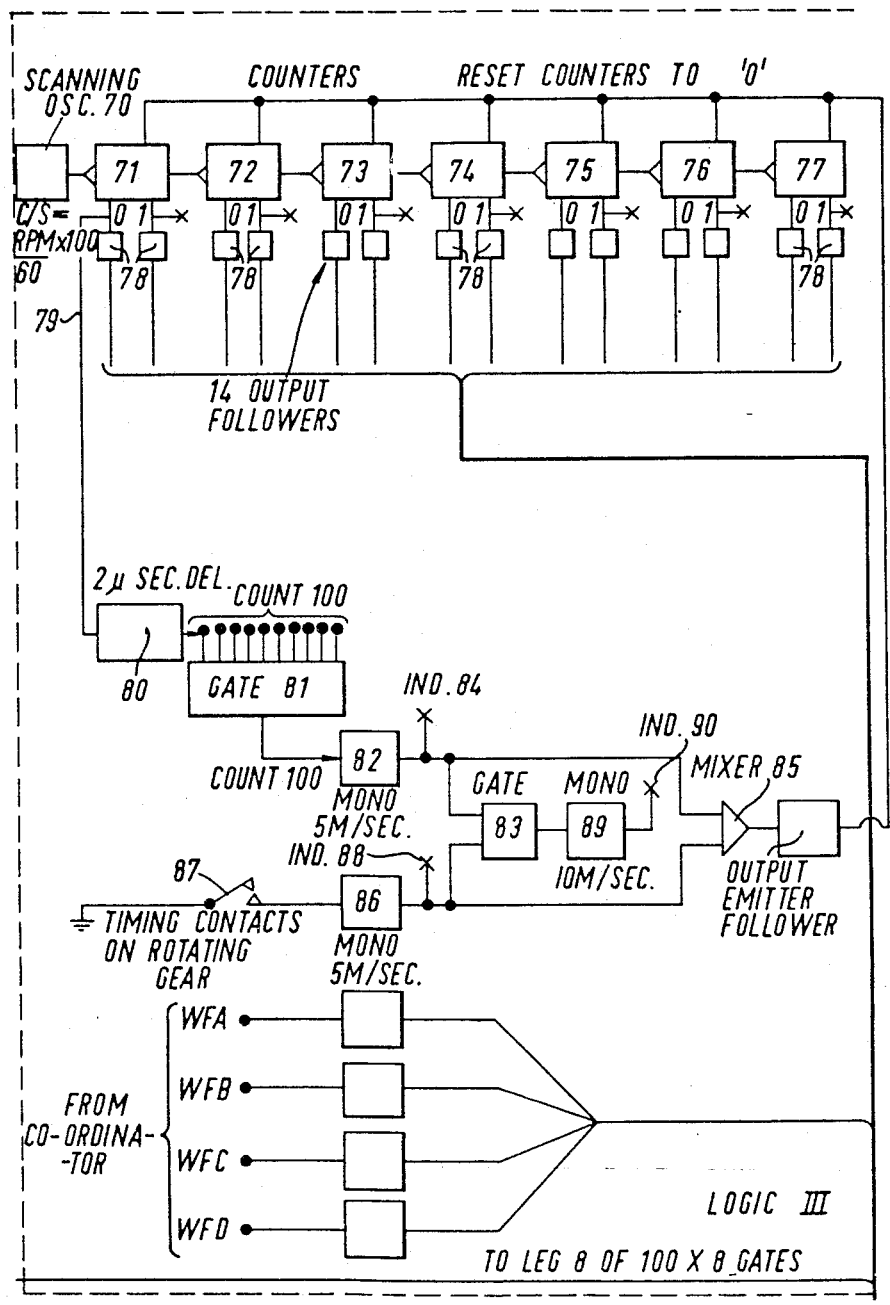
Figure 3E:
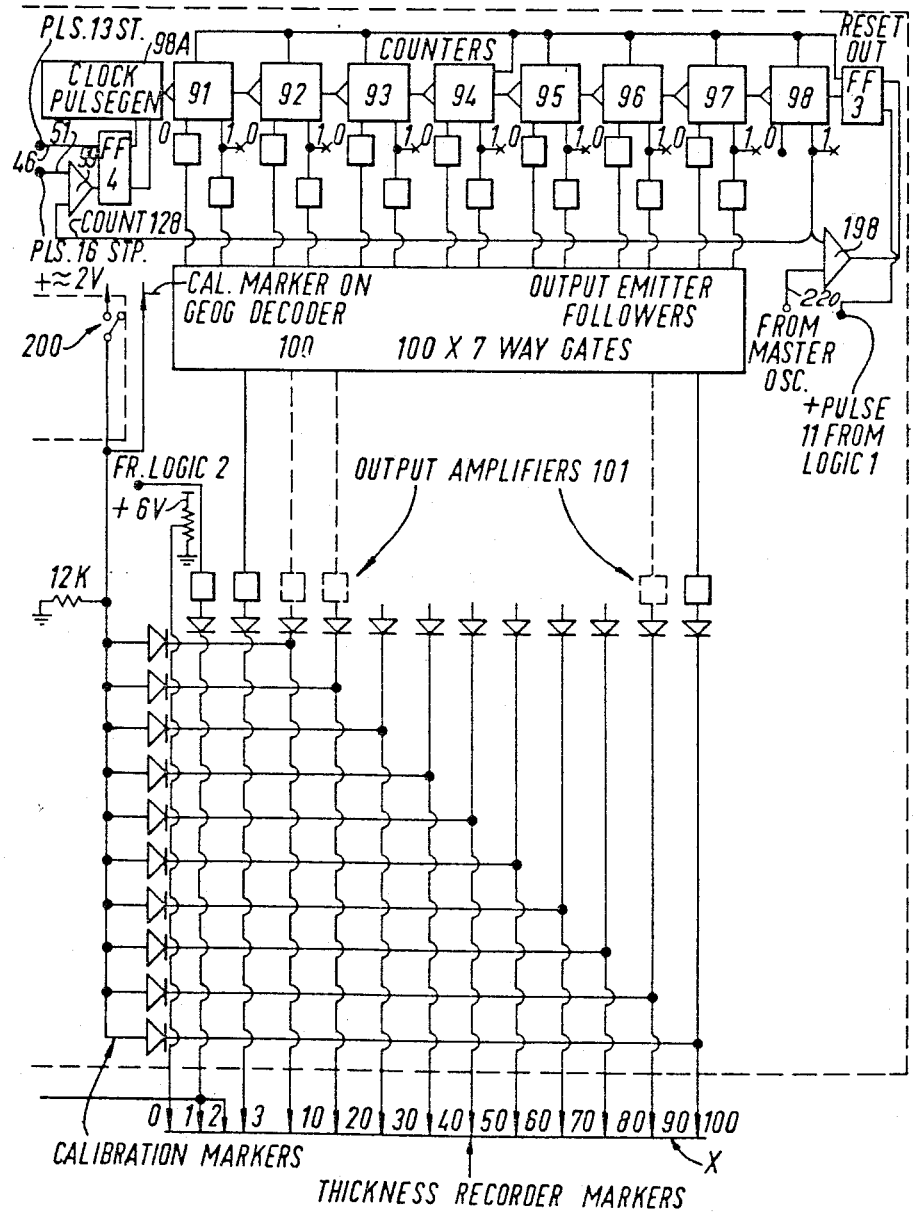
Figure 3F:
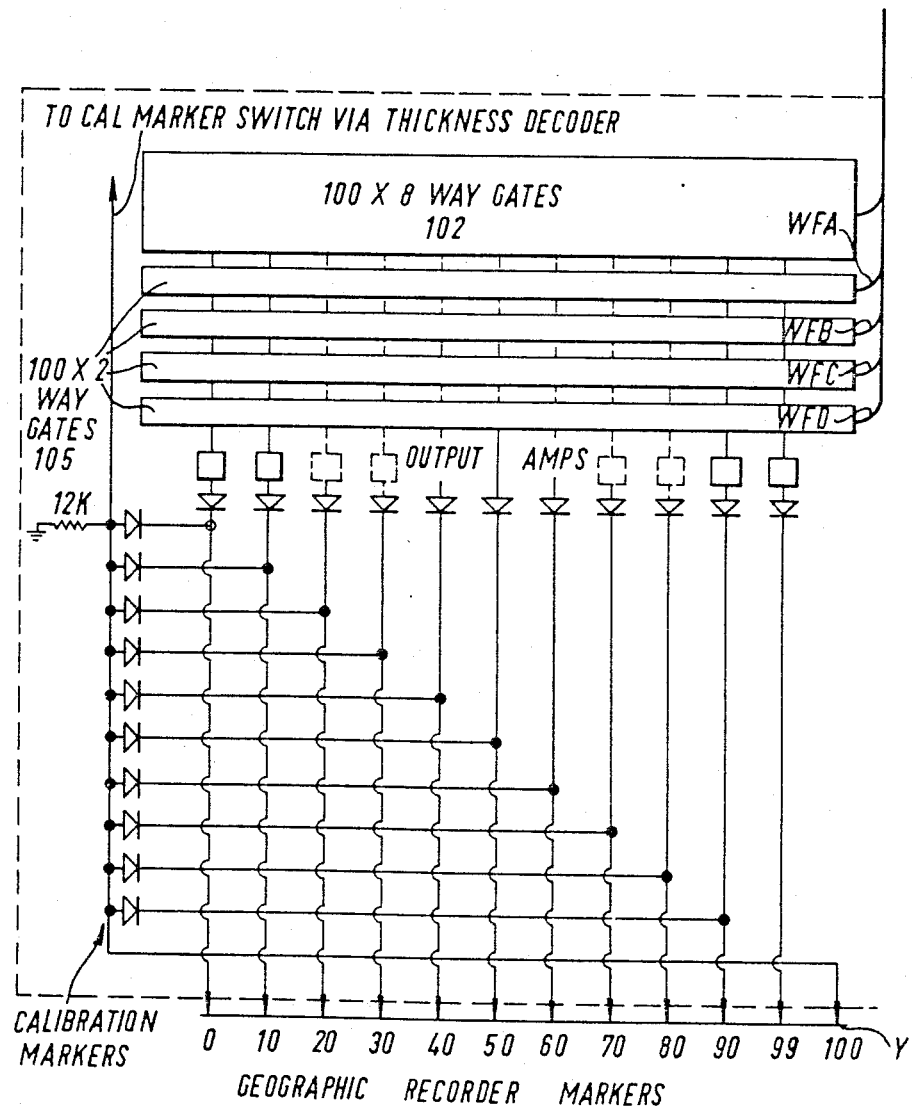

FIGS. 3A and 3F together form a block diagram of apparatus including electronic means for actuating the markers, which means comprise seven interrelated units. These units are: the co-ordinator and the main amplifier (FIG. 3A), logic I (FIG. 3B), logic II (FIG. 3C), logic III (FIG. 3D), thickness decoder (FIG. 3E) associated with chart X and geographic decoder (FIG. 3F) associated with chart Y.

The function of the co-ordinator is to ensure that the transducers A to D operate in sequence, and it also provides waveforms for the rest of the apparatus. Master oscillator 21 which, in this embodiment, operates at four kilocycles per second, feeds counters 22 and 23 which in turn are connected to gates A1, B1, C1, and D1 to provide sequential timing waveforms WFA, WFB, WFC and WFD each at one qaurter the frequency of the master oscillator. In this embodiment the gates A1, B1, C1, and D1 are AND gates, as indeed are all the gates used in the apparatus, and two inputs of each gate are connected to those two of the four counter outputs which are coincident with the desired timing waveforms, e.g. two inputs of gate A1 are connected to the outputs 0 of the counters 22 and 23. The counter/gate connections are not shown directly for reasons of clarity but are apparent from the terminal numbering in FIG. 3A. The output waveforms from the gates are differentiated at A2, B2, C2 and D2 and the front edges are used to trigger transmitters A3, B3, C3 and D3. A delayed waveform from a delay mechanism 24 or an inverter 25 is applied to the third input of each gate to delay the opening of each gate by $2\mu s$. and thus to eliminate unwanted coincidence at the input of gates A1 to D1 and therefore unwanted spikes at the output of these gates which may inadvertently trigger the transmitters. Waveforms WFA, WFB, WFC and WFD are applied to one input of gates A4, B4, C4 and D4 respectively, the other leg of each gate being connected to transducers A, B, C and D respectively, therefore any signals from transducer A, say, will appear at the output of gate A4 only during the period of waveform WFA. The combined outputs from the gates A4, B4, C4 and D4 are fed to a main amplifier 26. The main amplifier 26 is a thermionic amplifier with gain and bandwidth adequate for the pulses employed. These pulses are generally of half microsecond duration. Monitoring facilities are provided at 28, the operator being able to view the operation of each individual transducer by manually positioning the switch 27 to select the appropriate trigger pulse from the co-ordinator.

The output signal from the amplifier 26 passes to logic I (FIG. 3B) where pulses derived from the wall of the tube operate counters 31, 32 and 33. The purpose of logic I is to extract pulses 11, 13 and 16, FIG. 1, from each pulse train derived by the inspection transducers. Pulses 11, 13 and 16 (see FIG. 1) are extracted by means of gates 34, 35 and 36, the inputs of which are connected to the outputs of the counters 31, 32 and 33 so that gate 34 is opened by the first pulse, gate 35 by the third and gate 36 by the sixth. The counter/gate connections necessary to achieve this are indicated in FIG. 3B.

The counters are inhibited from counting spurious pulses by means of bistable device FF1 until forty microseconds after transmitter pulse time, a monostable device 42, fired by the master oscillator, timing this event. The counter device then counts the pulse train until arrival of pulse 16, i.e. the sixth pulse, at which time it is again inhibited by FF1 in response to the inverted output of gate 36 supplied to FF1 via line 53, a two microsecond delay circuit line 43 and an OR gate, two microsecond delay is incorporated in order that pulse 16 may be clearly extracted.

Pulse 16 is frequently absent, and to prevent the counter device counting a second reflection of the pulse train and therefore producing a spurious pulse 16, a second inhibiting pulse is obtained via the OR gate from a monostable device 41 ninety microseconds after transmitter pulse time.

The signals from gates 34 to 36 pass through inverters 37, 38 and 39. After passing through the inverter 37, the pulse 11 is supplied to a bistable device FF3 in the thickness decoder (FIG. 3E).

A further function of logic I is to determine when the thickness of the tube has decreased below a certain tolerance. After passing through the inverter 38 pulse 13 passes through an inverter 49 and is used to fire a monostable device 50 which provides a rectangular waveform of variable width, this waveform being supplied to gate 55 and to a monostable device 56. An input to the gate 55 and the output of a monostable device 56 are monitored at 57. Pulse 13 is also supplied via conductors 44 and 46 to a bistable device FF4 in the thickness decoder FIG. 3E, via conductors 44 and 47 to gate J1 of logic II, FIG. 3C, and via conductors 44 and 48 to trigger the monitor 57.

Pulse 16, after passing through the inverter 39 is supplied via a conductor 51 to the bistable device FF4 in the thickness decoder (FIG. 3E), via conductor 52 to an inverter 54, a monostable device 42A and to the gate 55 (the input to the gate is supplied to the monitor 57), and via a conductor 53 via the two microsecond delay and the OR circuit to the bistable device FF1.

The rectangular waveform from the monostable device 50 is adjusted so that with nominal tube wall thicknesses no coincidence exists with pulse 16. Thus any decrease in wall thickness will result in a reduction in the time interval between pulses 13 and 16, producing a coincident signal at the output of gate 55 which operates a bistable device FF2, which is normally held in the "off" state by pulses from the master oscillator to energise relay operator RL1 (FIG. 3C) as will be described hereinafter.

It has been stated hereinbefore that random scattering of the ultrasonic energy due to a lamination in the tube wall may make an absolute thickness measurement impossible. It is the function of logic II (FIG. 3C) to recognise when an absolute measurement of wall thickness has not been made. The criterion for a successful measurement is the presence of pulse 13 and pulse 16, and it would seem logical that the absence of pulse 16 could be used as an indication of a failure to make an absolute measurement. However in practice, pulse 16 cannot be used for this purpose because even with perfectly normal pipes pulse 16 is absent for quite a large proportion of the time because of inequalities in the pipe surface and the like. Thus pulse 13 must be used, but because this pulse also is not entirely reliable, the pulse must be absent for six consecutive occasions before it may be assumed that a defect exists.

Pulse 13 derived from logic I is applied to a gate J1, and on the other input to gate J1 appears waveform WFA from the co-ordinator, thus only those pulses 13 which originate at transducer A appear at the output of gate J1. It should be remembered that logic I (FIG. 3B) is handling the pulse trains from the four transducers in sequence, thus all pulses 13 from the four trains are appearing on line 47. Waveform WFA is also fed through a differentiating device J7 and an inverter J8 to the counters J4, J5, and J6.

If pulse 13 is present it is passed through an inverter J2 and a monostable device J3 to provide a resetting signal for three counters J4, J5, and J6, resetting them to zero. If pulse 13 is absent the counters count transmitter time pulses derived via J7 and J8. If pulse 13 is consecutively absent for seven counts i.e., six missing pulses, then an output signal is obtained from gate J9 which initiates monostable device J10. Monostable device J10 produces, for example, an output signal of seven milliseconds duration, i.e. the period of time required to count up to seven on counters J4, J5 and J6. Each transducer has a frequency of 1 kc./s., and during the operating period of the monostable device J10 a further count may or may not (depending on the presence or absence of a defect) be accumulating on counters J4, J5, and J6. The output signal from the monostable device J10 passes to a gate J11 to which is also fed waveform WFA. As the output signal from the monostable device J10 is maintained during the period of operation of the transducers B, C, and D, gate J11 is allowed to be open only during the period of operation of transducer A. Thus the output signal, if any, from section J, which is applied to a mixer 60, appears only during the period of operation of transducer A.

There are four similar sections J, K, L, and M of logic II corresponding to the four transducers A, B, C, and D rotating about the tube 1. Similar parts of the four sections J, K, L, and M are labelled in a correspondingly similar manner. Pulse 13 is fed to each of gates J1, K1, L1, and M1 and the output signals from each of gates J11, K11, L11, and M11 are fed to mixer 60 after which they are passed through an amplifier 61 to the first two markers of the chart X associated with the thickness decoder (FIG. 3E). The signal also passes from the amplifier 61 to a mixer 64, into which mixer is also fed the "out of tolerance" output signal (if any) from the bistable device FF2 in logic I and the combined signals, if any, then pass to the geographic decoder (FIG. 3F). The number of consecutively absent pulses 13 required to constitute a flaw may, of course, be varied in accordance with the surface speed at which the tube is scanned, to ensure that no significant area of flaw is missed.

A device 65 for producing an audible alarm in the presence of a defect is incorporated with logic II. This device 65 includes a relay RL1 with associated contacts RL1/1 and RL2/2, a two-note audio oscillator 66, relay RL2 with associated contacts RL2/1 and RL2/2, an audio amplifier, and two loud-speakers. The note is dependent on the nature of the defect, e.g. a high note for "out of tolerance" and a low note for "lack of pulses 13." A visual alarm signal is also provided through the relay contacts RL2/1 or RL1/1 and a 6.3 volt indicating light 67.

The thickness decoder (see FIG. 3E) is essentially a high speed counter made of counters 91 to 98 fed by a clock pulse generator 98A. The generator is started and stopped by pulses 13 and 16 coming from logic I, so that the number of pulses generated is directly proportional to the tube wall thickness. If the frequency on the clock pulse generator is carefully chosen then one inch of steel can be made to equal a count of one hundred, and pro rata, this frequency is equal to $$\frac{100}{t \text{ max.}}$$

where $t$ max equals the time in microseconds between pulse 13 and pulse 16 at a wall thickness of one inch. This frequency is approximately 3.85 megacycles per second.

A count indicating the tube wall thickness is held from pulse 16 time until the next transmitted time pulse, and the counters are reset to zero at each transmitter time pulse coming from the master oscillator 21 in the co-ordinator via 220 to a mixer 198 and a bistable device FF3.

The timing sequence commences with pulse 11 from logic I. The reset line to counters 91 to 98 is released via the bistable device FF3 thus allowing the counters to start counting upon initiation of the clock pulse generator via pulse 13 and FF4. The clock pulse generator operates until the arrival of pulse 16 at which time FF4 reverts to the "stop" position. In the event of pulse 16 being absent the counter chain counts up to count 128, i.e. the count on the seven binary counters, and the count 128 goes via mixer 99 to bistable FF4 to stop the clock pulse generator and resets the counter chain to zero via mixer 198 and bistable device FF3.

The successful count held by the counter chain is decoded via a 100×7 way gates in the form of a diode matrix and amplifiers 101 to the appropriate marker on the thickness recorder. The gates, each with seven inputs, are used to identify each marker pen with the corresponding count on the counter outputs and each consists of seven transistors having their collector-emitter paths in series between a source and the output amplifiers and their bases as the inputs.

Calibration marks are applied to the recording paper, by mechanical closure of switch 200, at intervals of a few inches, spaced the equivalent of 0.1 inch of steel apart and the indicating markers are spaced across the chart X at distances proportional to 0.01 inch of steel. A constantly energised datum marker is also provided.

Logic III (FIG. 3D) comprises means for dividing the tube circumference into one hundred equal portions.

A scanning oscillator 70 has a frequency such as to produce 100 pulses in the time taken for one revolution of the rotating unit, and is followed by a counter chain (counters 71 to 77). The counters are reset to zero either at the count of 100 or at the completion of one revolution of the rotating unit, which ever occurs first, so that the chart Y may be scanned accurately.

These resetting facilities are provided by the monostable devices 82 and 86. Accurate scanning takes place when monostable devices 82 and 86 fire in coincidence.

From the 0 output of counter 71 is a conductor 79 to a two-microsecond delay device 80 connected to a gate 81, the other inputs of which are connected to the outputs of the counters 71 to 77 corresponding to a count of 100. The output of gate 81 is fed through the monostable device 82, gate 83, an indicator 84, and mixer 85. When the frequency of the scanning oscillator 70 is accurately adjusted, i.e. frequency equals $$\frac{\text{r.p.m.}}{60} \times 100$$

cycles per second, the output of the monostable device 82 derived from gate 81 is coincident with the output of the monostable device 86 derived from the rotating unit via cam operated contacts 87 which close once per revolution. The output of the monostable device 86 goes to gate 83, indicator 88, and mixer 85, the output from which, through the emitter follower, resets the counters 71 to 77. The output from the gate 83 passes through a monostable device 89 to indicator 90, used during calibration of the apparatus to indicate the time relation between the outputs of monostable devices 82 and 86.

The geographic recorder includes one hundred eight-way gates 102 (FIG. 3F), seven inputs of each gate being used to decode the outputs of counters 71 to 77 in logic III, and the eighth leg being supplied with the "out of tolerance" signal from logic I via logic II. The gates 102 are similar to the gates of the thickness recorder though, of course, they have an extra input. The waveforms A, B, C, and D from the co-ordinator are supplied to the gates 105.

Figure 4:
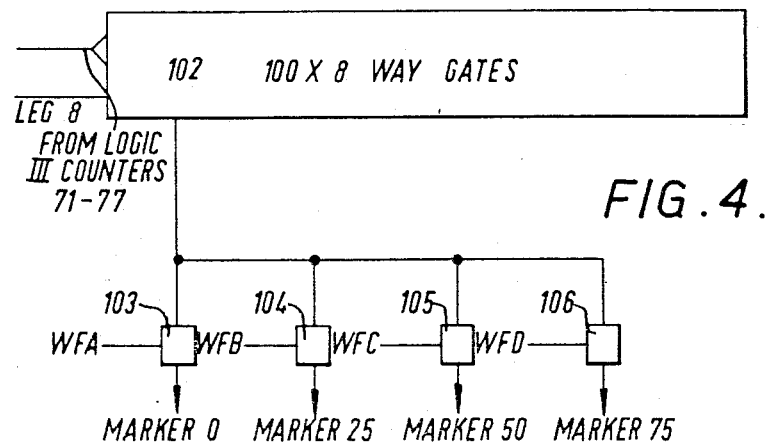
FIG. 4 shows a simplified block diagram of part of the apparatus of FIG. 3F.
Figure 4A:
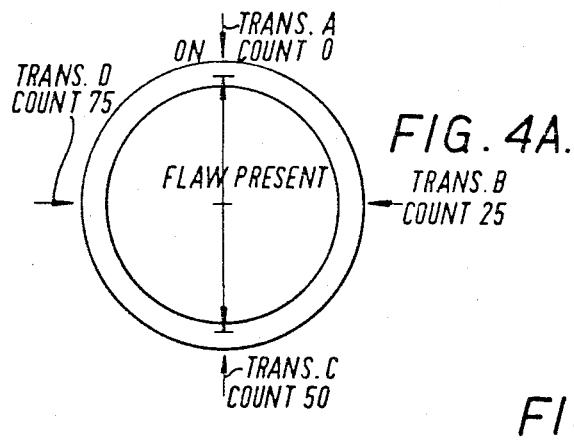
FIG. 4A shows the position of ultrasonic transducers around the circumference of a tube.

It will be assumed, for the sake of example, that the scanning counter (counters 71 to 77 in logic III) is at "count zero," and a flaw is detected, thus bringing the eighth leg of the decoder to the "up" condition. A signal now appears at the "0" output of the hundred-way decoder 102. If it is further assumed that the flaw in question was detected by transducer A, then waveform "A" (WFA from the co-ordinator) is present at gate 103 (FIG. 4), and thus an output is obtained from gate 103 which is passed to marker 0. The next transducer to be energised will be transducer B, 250 microseconds later. However, assuming no flaw is detected by this transducer the eighth leg of the decoder remains in the "down" condition and no output is obtained from gate 104 of the decoder. Transducer C is next to be energised, two milliseconds after transducer A, in this time the scanning counter running at such a lower speed has not changed its count, being still at zero. Transducer C detects a flaw, therefore, an output appears at the C output of the hundred-way decoder 102 exactly as for transducer A. However, waveform C (WFC from the co-ordinator) is present on gate 105 and the output of gate 105 is connected to marker 50 of the recorder. Thus the two defects which are spaced 180° round the tube from each other appear proportionally spaced on the chart Y (see FIG. 4A). If it is assumed that transducer D, last to operate before the cycle repeats itself, detects no defect, no output will be obtained from a gate 106 of the decoder. If a flaw had been present, waveform D (WFD from co-ordinator) would have directed the signal via the gate 106 to marker 75. Thus it can be seen that the "flaw" signal is supplied to all the gates, that the counters 71 to 77 determined the physical position of the scanning head round the tube relative to the datum position, and the gates 105 coordinate the flaw signal with the appropriate transducer position.

Figure 6:
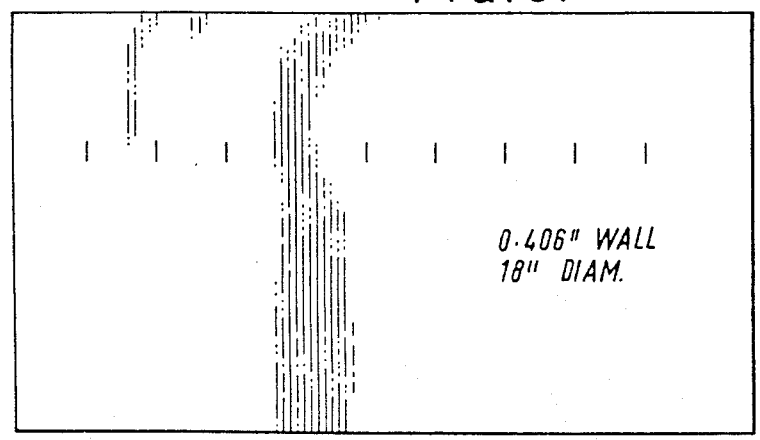
FIGS. 5 and 6 are facsimiles of actual recordings showing defects in a tube wall.
Figure 5:
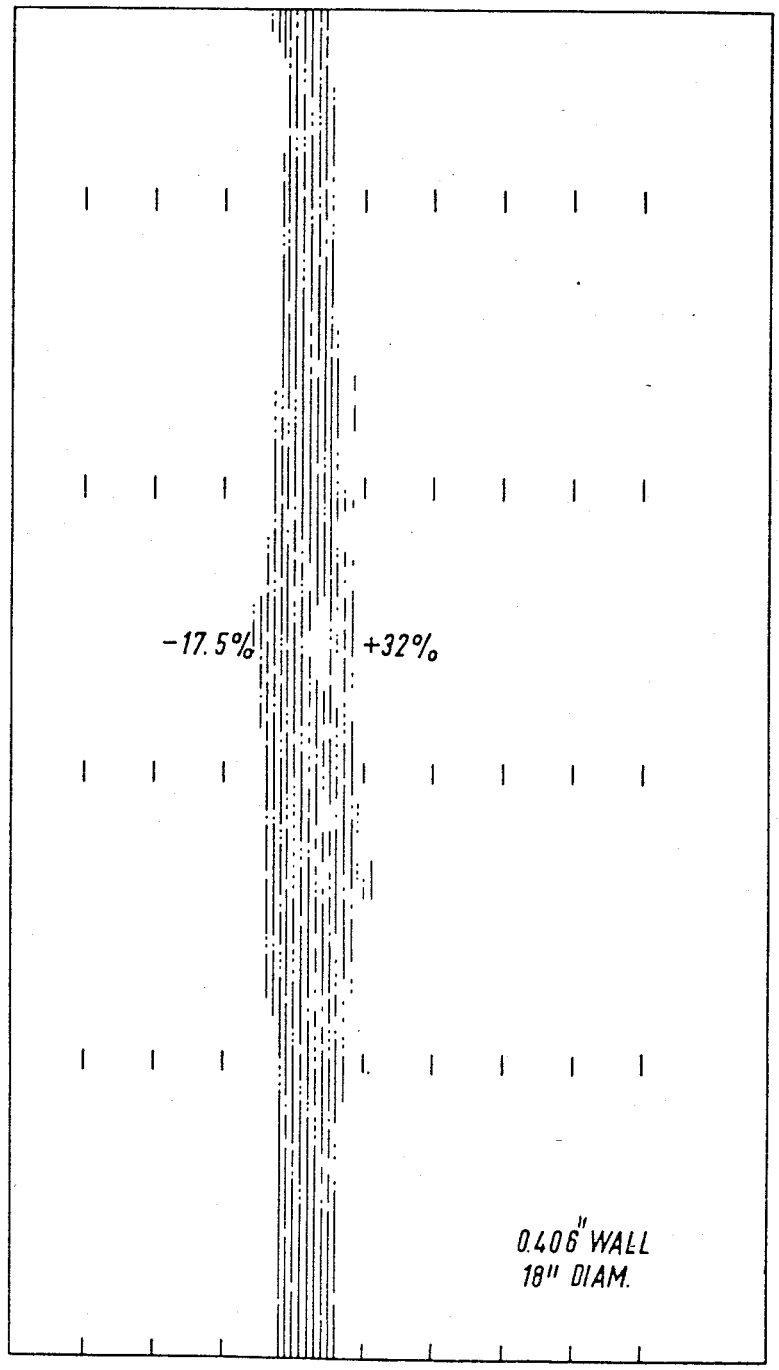

FIGS. 5 and 6 are facsimiles of actual recordings on chart X of a thickness decoder. In FIG. 5 large variations in the thickness of the wall of the tube occur towards the middle of the tube. As the length of chart X is proportional to the length of the helix described about the tube by the rotating unit, the longitudinal scale is considerably compressed. This compression is deliberate in order to emphasise the nature of the wall cross-section; furthermore the longitudinal and circumferential dimensions are accurately scaled by the geographic recorder. FIG. 6 shows an example of laminations occurring at the end of the tube.

FIGS. 8 to 12 illustrate a preferred construction for each set of the aforesaid markers. In this construction, a fine gauge corrosion-resistant conducting wire 110 (made, for instance, of platinum-iridium) is wound in helical manner round an elongated, flat former 111 of an insulating material, the turns of the winding being spaced so that they are out of touch with each other. The wire is secured to the former by suitable insulating adhesive or cement (e.g. that sold under the trade name "Araldite"). The wire winding is slit longitudinally (e.g. by a saw cut 114) along one of the narrower sides of the former so as to provide a plurality of electrically-separate ring-like wire units on the former. One free end 112 of each ring-like unit is bent so as to project away from the former. The projecting ends of adjacent rings being disposed on opposite sides of the former, thereby facilitating the soldering of connecting wires to the ring-like units. The former is tapered in cross-section at 113 so that the portion of each ring-like unit opposite to the projecting end is similarly tapered so as to reduce to a minimum the area contacted by the ring-like unit on an electro-chemical chart 116 which is traversed beneath the units in a direction (as shown by the arrow in FIG. 12) at right angles to the longitudinal axis of the former and which constitutes the aforesaid chart X or chart Y.

The former 111 may, for example, be made of "Tufnol" and be ⅛ inch thick, 5½ inches long and ⅜ inch wide. The wire 110 may be of 0.02 inch diameter and wound on the former at 20 turns per inch. The saw cut 114 may be 0.015 inch wide. Preferably the wire is cemented to the former only on the two flat sides of the former at 115, since it is necessary to ensure that the parts of the ring-like units which will contact the electro-chemical paper are exposed.

Two marking assemblies as described above are used in the apparatus hereinbefore described with reference to FIGS. 1 to 7, one assembly being used as the marking means for each of the two charts X and Y so that the units are energised appropriately. One hundred units are provided in each assembly and suitably the units are spaced 0.05 inch from each other so that the assembly covers a 5 inch width of recording paper. Each recording chart is kept slightly damp so as to be electrically conductive and passes over a grounded conducting bar or plate 117 directly opposite to the marking assembly.

I claim:

1. A method of automatically recording the thickness of a product and the location of a defect in the product, comprising the steps of continuously scanning the surface of the product by ultrasonic pulses, detecting reflected pulses trains, selecting pulses other than the first two pulses from the detected pulse trains, measuring the time interval between said selected pulses, utilizing the measured time interval to provide on a first recording medium a first permanent recording of the thickness of the product and the depth of a defect in the product in relation to one other dimension of the product, and comparing the measured time interval with a control value equal to the desired product thickness to generate, in the event of a discrepancy between the time interval and the control value, a signal to provide on a second recording medium a second permanent record of the position of the defect in relation to said other dimension and the third dimension of the product.

2. An apparatus for automatically recording the thickness of a product and the location of a defect in the product comprising scanning means for scanning the surface of the product and including means for generating ultrasonic pulses, means for detecting reflected pulse trains and selecting pulses other than the first two pulses from the detected pulse train, means for measuring the time interval between the selected pulses, first recording means controlled by signals from said measuring means for providing on a first recording medium a first permanent record of the thickness of the product and the depth of a defect in the product in relation to one other dimension of the product, comparison means for comparing the time interval with a control value to generate, in the event of a discrepancy between the time interval and the control value, a signal, and second recording means utilizing said signal to provide on a second recording medium a second permanent record of the position of said defect in relation to said other dimension and the third dimension of the product.

3. A method as claimed 1, in which the pulses are transmitted from a plurality of transducers in sequence, including synchronizing the signal generated in the event of discrepancy with the transmitted pulses to locate the corresponding recording correctly on the recording medium of the second permanent record.

4. A method as claimed in claim 3, wherein the time interval between the third reflected pulse and a subsequent pulse is measured.

5. An apparatus as claimed in claim 2, wherein said control value corresponds to the pulse time interval expected for the thickness of the object being scanned.

6. An apparatus as claimed in claim 5, wherein the means for generating ultrasonic pulses comprises a plurality of ultrasonic transducers mounted on the scanning means for rapid rotation about a longitudinally-moving product to be tested, each transducer being directed radially towards the axis of rotation and constituting ultrasonic generating and detecting means.

7. An apparatus as claimed in claim 6, further comprising means for synchronizing the signal generated in the event of discrepancy with the transmitted pulses to ensure that the second recording means correctly records on the recording medium.

8. An apparatus according to claim 7 wherein said recording means comprises a plurality of markers arranged in two sets for providing said first and second records respectively, the markers of each set being arranged side by side in a row and being adapted to produce an aforesaid record on a chart moved transversely of said row.

9. An apparatus according to claim 8, further comprising means for detecting the absence of coherent reflected pulses and means conditioned by said detecting means for marking at least one of said charts to indicate in at least one selected dimension the absence of such pulse.

References Cited

UNITED STATES PATENTS

| | | | |
|---|---|---|---|
| 2,210,380 | 8/1940 | Potter | 346—35 |
| 2,836,059 | 5/1958 | Beaujard et al. | 73—67.8 |
| 2,969,671 | 1/1961 | Sproule | 73—67.9 |
| 3,036,151 | 5/1962 | Mitchell et al. | 73—67.9X |
| 3,074,067 | 1/1963 | Gallentine et al. | 346—74(E)X |
| 3,159,023 | 12/1964 | Steinbrecher | 73—67.8 |
| 3,169,393 | 2/1965 | Stebbins | 73—67.9 |
| 3,228,233 | 1/1966 | Keldenich | 73—67.8 |
| 3,285,059 | 10/1966 | Bogle | 73—67.9 |
| 3,373,602 | 3/1968 | Wendt et al. | 73—67.5 |

OTHER REFERENCES

Supersonic Inspection, American Machinst, May 23, 1946, pp. 131 and 132.

Ultrasonic Automation—The Autosonic System, Instrument Practice, April 1957, pp. 353–356.

The Immersed Inspection of Metal Plate; McClung, R. W., Nondestructive Testing, September–October 1959, pp. 270–275.

RICHARD C. QUEISSER, Primary Examiner

J. P. BEAUCHAMP, Assistant Examiner

U.S. Cl. X.R.

346—35, 74